US009764303B2

(12) United States Patent
Lin et al.

(10) Patent No.: US 9,764,303 B2
(45) Date of Patent: Sep. 19, 2017

(54) MANUFACTURING METHOD FOR DETECTION DEVICE AND DETECTION DEVICE MANUFACTURED THEREFROM

(71) Applicant: National Tsing Hua University, Hsinchu (TW)

(72) Inventors: Shang-Chi Lin, Hsinchu (TW);
Chun-Wei Lee, Hsinchu (TW);
Shueh-Yao Chu, Hsinchu (TW);
Chao-Min Cheng, Hsinchu (TW);
Fan-Gang Tseng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 188 days.

(21) Appl. No.: 14/798,911

(22) Filed: Jul. 14, 2015

(65) Prior Publication Data

US 2016/0220976 A1 Aug. 4, 2016

(30) Foreign Application Priority Data

Feb. 2, 2015 (TW) .............................. 104103480 A

(51) Int. Cl.
*B01J 19/00* (2006.01)

(52) U.S. Cl.
CPC .. *B01J 19/0046* (2013.01); *B01J 2219/00378* (2013.01); *B01J 2219/00382* (2013.01);
(Continued)

(58) Field of Classification Search
CPC ............ B01L 2300/0819; B01L 3/5088; B01J 19/0046; B01J 2219/00639;
(Continued)

(56) References Cited

U.S. PATENT DOCUMENTS 6,565,813 B1 * 5/2003 Garyantes ........... B01F 13/0071
422/553
2002/0142483 A1 * 10/2002 Yao ...................... B01J 19/0046
436/180
(Continued)

FOREIGN PATENT DOCUMENTS

CN 102914536 2/2013
TW 201502514 A 1/2015

OTHER PUBLICATIONS

Bernier et al., "Dimatix Bench-Top Precision Digital Materials Deposition System", Press Center Fujifilm USA, Jan. 22-24, 2006, 1 page http://www.fujifilmusa.com/press/news/display_news?newsID=880141.
(Continued)

*Primary Examiner* — Brian R Gordon
(74) *Attorney, Agent, or Firm* — Muncy, Geissler, Olds & Lowe, P.C.

(57) ABSTRACT

A method for manufacturing a detection device includes dispensing a plurality of reagent droplets of a detection reagent to a fiber substrate by a dispensing unit, and absorbing the plurality of reagent droplets by the fiber substrate to form the detection device having at least one detection pore. The dispensing unit includes two plastic sheets and a water retention substrate, the water retention substrate contains the detection reagent, and one of the two plastic sheets has at least one opening.

5 Claims, 17 Drawing Sheets

(52) U.S. Cl.
CPC ........... *B01J 2219/00387* (2013.01); *B01J 2219/00619* (2013.01); *B01J 2219/00639* (2013.01); *B01J 2219/00659* (2013.01); *B01J 2219/00704* (2013.01)

(58) Field of Classification Search
CPC .... B01J 2219/00644; B01J 2219/00382; B01J 2219/00385; B01J 2219/00427; B01J 2219/0043; B01J 2219/00682; B01J 2219/00684; B01J 2219/686; B01J 2219/00527; C40B 60/14
See application file for complete search history.

(56) References Cited

U.S. PATENT DOCUMENTS

| | | | | |
|---|---|---|---|---|
| 2004/0018615 | A1* | 1/2004 | Garyantes | B01F 13/0071 435/305.2 |
| 2004/0086423 | A1 | 5/2004 | Wohlstadter et al. | |
| 2008/0268440 | A1* | 10/2008 | Liu | B01J 19/0046 435/6.12 |
| 2015/0018247 | A1* | 1/2015 | Tseng | B01J 19/0046 506/13 |

OTHER PUBLICATIONS

Carrilho et al., "Understanding Wax Printing: A Simple Micropatterning Process for Paper-Based Microfluidics", Anal. Chem., Aug. 15, 2009, pp. 7091-7095, vol. 81 No. 16.

* cited by examiner

MANUFACTURING METHOD FOR DETECTION DEVICE AND DETECTION DEVICE MANUFACTURED THEREFROM

CROSS REFERENCE TO RELATED APPLICATIONS

This Non-provisional application claims priority under 35 U.S.C. §119(a) on Patent Application No(s). 104103480 filed in Taiwan, Republic of China on Feb. 2, 2015, the entire contents of which are hereby incorporated by reference.

BACKGROUND OF THE INVENTION

Field of Invention

The present invention relates to a manufacturing method for a detection device and the detection device manufactured therefrom.

Related Art

In clinical medicine or in food inspection, detecting a specific target is required. Specifically, in clinical medicine, it can preliminarily assess whether human organs properly functions by detecting the contents of various biomolecules, for example the carbohydrate content or the contents of various proteins and the like of blood, urine, and other body fluids, of the human body. In food inspection, it may further preliminarily assess whether the food contains excess carcinogens or pesticide residues and the like by detecting food ingredients or substances of products, or even the method of protein detection is used to identify genetically modified food.

Generally, biomedical detections or food safety detections are mostly fluorescence detection methods which combine target biomolecules (i.e. detection targets) with specific fluorescent substances to generate fluorescence. However, fluorescence detection methods require a large quantity of liquid reagents and a certain volume of detection substrate, for example 96-well plates. Moreover, liquid reagents are inconvenient to carry, inconvenient to be preserved and easy to deteriorate. Therefore, conventional methods of biomedical detection or food safety detection have to be performed in laboratory conditions or under requirements of specific equipment, and they are not suitable for simple and instant detections. Consequently, research and development personnel or dealers engaged in biomedical detections or food safety detections focus on various simple detections which have simplified detection steps and are not confined in laboratories.

Meanwhile, as the rising consciousness of health and food safety, the concept of home self-detection is more and more popular. The home self-detection allows the users to easily and simply detect objects anytime at home. In general, this simple detection utilizes the color change of the detection reagent to indicate the detection result, so the user can easily realize the detection result without additional equipment or with only a simple device instead. Moreover, when the color change becomes larger, the user may go to a hospital for further detailed examination. Accordingly, the home self-detection has the advantages of convenience and low costs. In addition, common home self-detection devices, for example blood glucose meters, are almost made by complex processes and high costs.

Moreover, the thin substrate is easy to carry. For example the fiber material has the characteristic of absorbing droplets to allow droplets to react with liquid samples containing specific targets. Therefore, developing the specific process for such thin substrate may contribute to promoting such biomedical detection devices or food safety detection devices, so that operating the detections may be easier and less costly.

SUMMARY OF THE INVENTION

In view of the above problems, the object of the present invention is to provide a manufacturing method for a detection device and the detection device manufactured therefrom which prepares the thin substrate into a small sized and portable detection device by utilizing the characteristics of the thin substrate and a simple, novel, and low-cost manufacturing method thus allowing patients to perform a preliminary detection for a specific target as a biomedical detection or a food safety detection.

To achieve the above object, a manufacturing method for a detection device according to the present invention comprises dispensing a plurality of reagent droplets to a thin substrate by a dispensing unit and absorbing the plurality of reagent droplets with the thin substrate to form at least one detection area of the detection device.

In one embodiment, the thin substrate has at least one hydrophilic area and absorbs the reagent droplets by the hydrophilic surface to form the detection area.

In one embodiment, the hydrophilic area is defined by a hydrophobic material of the thin substrate.

In one embodiment, the manufacturing method further comprises adding the hydrophobic material on a surface of the thin substrate by a surface processing unit to define the hydrophilic area.

In one embodiment, the dispensing unit is a stamping dispensing unit and comprises a droplet forming element having at least one opening and a droplet accommodating unit disposed on one side of the droplet forming element.

In one embodiment, the manufacturing method further comprises providing an external force to the stamping dispensing unit, so that the reagent droplets protrude from the opening.

In one embodiment, the manufacturing method further comprises forming the reagent droplets on the dispensing unit by a droplet forming unit, and the reagent droplets are separate.

In one embodiment, a surface of the droplet forming unit has at least one concave portion, the reagent is accommodated in the concave portion, and at least a part of the surface of the reagent protrudes from the surface of the droplet forming unit.

In one embodiment, the manufacturing method further comprises making the surface of the droplet forming unit approach or contact a surface of the dispensing unit, so that the reagent is partially transferred to the dispensing unit and forms the reagent droplets.

In one embodiment, the concave portion is a flow channel.

To achieve the above object, a detection device according to the present invention is produced by a manufacturing method. The manufacturing method comprises dispensing a plurality of reagent droplets to a thin substrate by a dispensing unit and absorbing the plurality of reagent droplets with the thin substrate to form at least one detection area of the detection device.

In one embodiment, the thin substrate has at least one hydrophilic area and absorbs the reagent droplets by the hydrophilic surface to form the detection area.

In one embodiment, the hydrophilic area is defined by a hydrophobic material of the thin substrate.

In one embodiment, the manufacturing method further comprises adding the hydrophobic material on a surface of the thin substrate by a surface processing unit to define the hydrophilic area.

In one embodiment, the dispensing unit is a stamping dispensing unit and comprises a droplet forming element having at least one opening and a droplet accommodating unit disposed on one side of the droplet forming element.

In one embodiment, the manufacturing method further comprises providing an external force to the stamping dispensing unit, so that the reagent droplets protrude from the opening.

In one embodiment, the manufacturing method further comprises forming the reagent droplets on the dispensing unit with a droplet forming unit, and the plurality of reagent droplets are separate.

In one embodiment, a surface of the droplets forming unit has at least one concave portion, the reagent is accommodated in the concave portion, and at least a part of the surface of the reagent protrudes from the surface of the droplet forming unit.

In one embodiment, the manufacturing method further comprises making the surface of the droplet forming unit approach or contact a surface of the dispensing unit, so that the reagent is partially transferred to the dispensing unit and forms the reagent droplets.

In one embodiment, the concave portion is a flow channel.

As mentioned above, the manufacturing method for the detection device according to the present invention utilizes the characteristic of the thin substrate which absorbs the droplets and dispenses the reagent droplets to the thin substrate by a dispensing unit. After absorbing the reagent droplets to form the detection device having detection areas, the thin substrate may be used as a biomedical detection device or a food safety detection device. In other words, the manufacturing method of the present invention has developed simple and low-cost process for the thin substrate, and thus it is contributive to promote the detection device of such thin substrate. Moreover, because the detection device of the present invention is prepared by the thin substrate, it is beneficial for the user to carry or keep in the home environment in order to achieve the efficiency of home self-detection.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
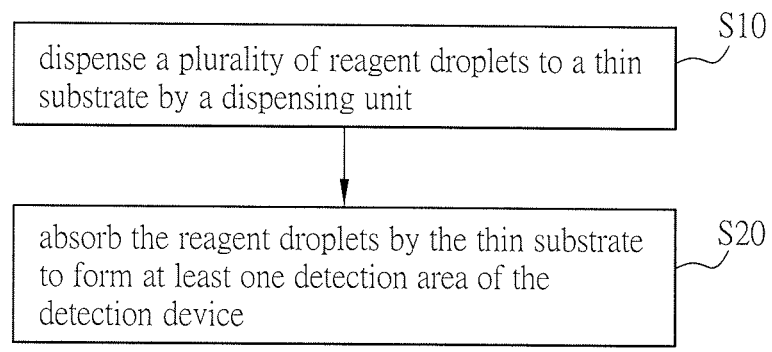
FIG. 1 is a flow chart of the manufacturing method for the detection device of the first embodiment of the present invention.

The manufacturing method for the detection device of the present embodiment is the method of manufacturing the detection device and hereinafter referred to as the manufacturing method. Wherein, the detection device manufactured by the manufacturing method of the present embodiment may be used as a biomedical detection device or a food safety detection device. Referring to FIG. 1, it is a flow chart of the manufacturing method for the detection device of the first embodiment of the present invention. The present invention provides a manufacturing method for a detection device comprising the steps of: dispensing a plurality of reagent droplets to a thin substrate with a dispensing unit (step S10); and absorbing the reagent droplets with the thin substrate to form at least one detection area of the detection device (step S20).

Figure 2:
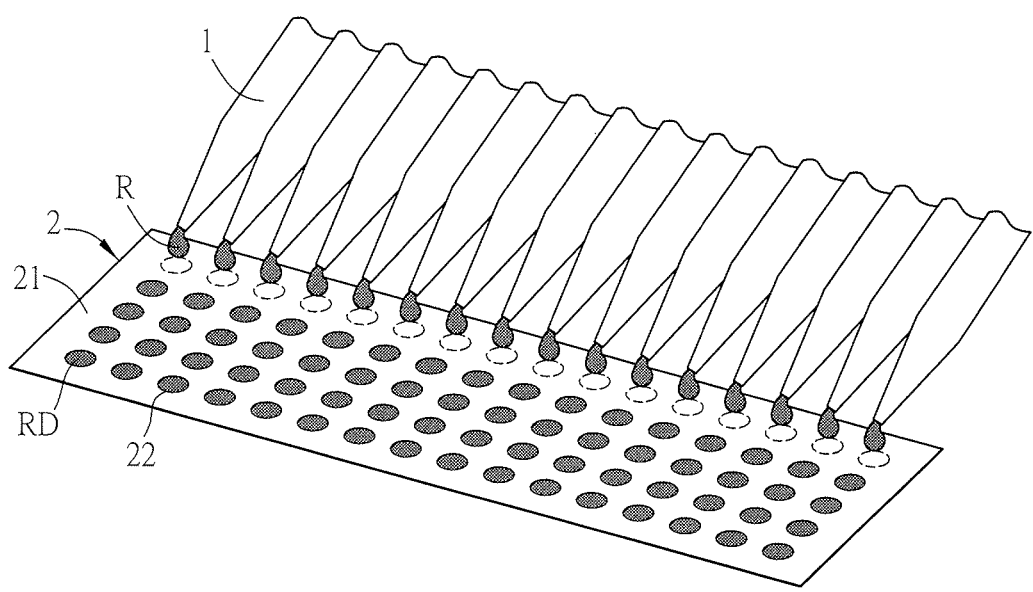
FIG. 2 is a schematic diagram of the dispensing unit and the detection device of the first embodiment of the present invention.

FIG. 2 is a schematic diagram of the dispensing unit 1 and the detection device 2 of the first embodiment of the present invention. Referring to FIGS. 1 and 2, in step S10, a plurality of reagent droplets RD are dispensed to a thin substrate 21 by the dispensing unit 1. The dispensing unit 1 of the embodiment is a device which can accommodate or bear the reagent R and dispense the reagent R to other substrates in droplets form (reagent droplets RD). In this embodiment, it is a dropper as an example. Moreover, the thin substrate 21 of the embodiment is used to receive and absorb the reagent droplets RD, the material of the thin substrate 21 of the embodiment is a fiber substrate such as, for example but not limited to, bamboo, wood, paper, cotton or other plant fibers, and its material is preferably a high-density fiber substrate.

In the embodiment, the range of the average pore diameter of the high-density fiber substrate is between 0.7 and 12 µm and preferably between 1 and 20 µm, and different pore-diameter high-density fiber substrates can be selected for using depending on the type of the test sample. For example, if the test sample is blood, the high-density fiber substrate with the pore diameter of 20 µm can be used. If the test sample is urine, the high-density fiber substrate with the pore diameter of 10 µm can be used. Furthermore, both the range and the preferable range regarding the average pore diameter of the high-density fiber substrate described above respectively comprise the combination of any two integers within the above range.

As shown in FIG. 2, the dispensing unit 1 may be disposed near one side of the thin substrate 21, and the reagent droplets RD are delivered by the dispensing unit 1. When the reagent droplets RD approach or contact the thin substrate 21, they may be transferred to the thin substrate 21 by the siphonage and the capillary action of the thin substrate 21. After the thin substrate 21 absorbs the reagent droplets RD, the detection area 22 of the detection device 2 is formed (step S20). Specifically, when the reagent droplets RD contact the thin substrate 21, the thin substrate 21 may destroy the surface tension of the reagent droplets RD and further utilizes its siphonage and capillary action to transfer the reagent droplets RD to the thin substrate 21. Then, the thin substrate 21 utilizes its capillary action of the xylem fiber substrate and vascular tissue of the plant fiber, so the reagent droplets RD can be absorbed on the detection area 22. Moreover, the detection area 22 of the detection device 2 of the embodiment is the area which is formed after the thin substrate 21 absorbs the reagent droplets RD.

Here, the reagent R may include a receptor, peptide, protein, antigen, antibody, enzyme, nucleic acid, ligand, other biological or chemical substances which react with objects to be isolated, or chemical substances used for detecting food additives or pesticides. After the thin substrate 21 absorbs the reagent droplets RD to form the detection area 22, the detection area 22 also includes the above biological or chemical substances to detect the corresponding detection target of the test sample. Specifically, the test sample may be blood, urine, other body fluids, and food ingredients or products. The test sample can be directly placed on the detection device 2. The test sample reacts with the biological or chemical substances of the reagent droplets RD and then the color reaction occurs for the purpose of detection. The detection device 2 of the embodiment can apply to any detections which determine the result by coloring such as cancer detection, gene detection, protein detection, detecting various viruses/bacteria, allergen detection, food detection and other aspects.

Figure 3A:
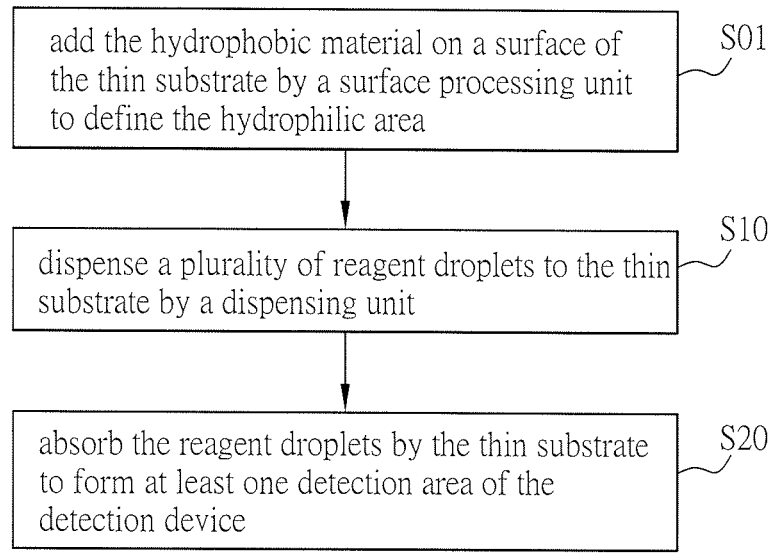
FIG. 3A is a flow chart of the manufacturing method for the detection device of the second embodiment of the present invention.
Figure 3B:
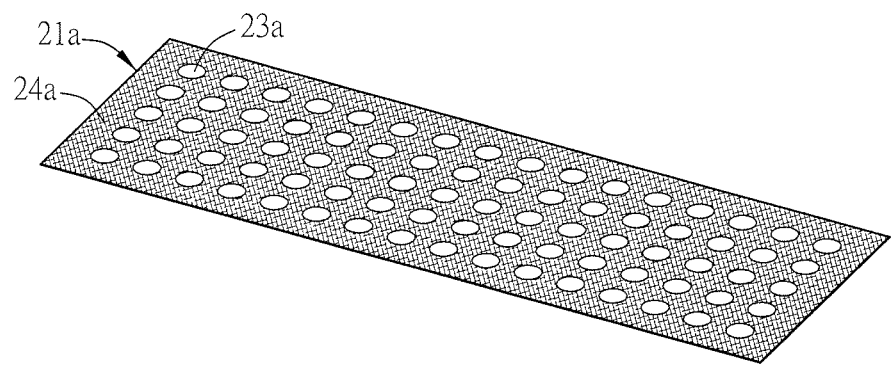
FIG. 3B is a schematic diagram of the thin substrate of the second embodiment of the present invention.

FIG. 3A is a flow chart of the manufacturing method for the detection device of the second embodiment of the present invention. FIG. 3B is a schematic diagram of the thin substrate of the second embodiment of the present invention. Referring to FIGS. 3A and 3B, preferably, the thin substrate 21a of the embodiment may further have at least one hydrophilic area 23a. After the hydrophilic surface of the hydrophilic area 23a absorbs the reagent droplets RD, the detection area 22 shown in FIG. 2 is formed. Correspondingly, the manufacturing method of the embodiment further includes the step S01 which is adding the hydrophobic material on a surface of the thin substrate by a surface processing unit to define the hydrophilic area. Here, the surface processing unit of the embodiment may accommodate the hydrophobic material, and it may form the hydrophobic material on the thin substrate 21a and thereby define the hydrophilic area 23a. Specifically, the embodiment may define a hydrophilic area 23a by wax printing, so that the hydrophobic material may be wax. Of course, in other embodiments it may also be other hydrophobic material having hydrophobicity, and the present invention is not limited thereto. Moreover, the surface processing unit is a device which may accommodate wax and have the function of wax spraying such as a printer. Wax is disposed on the thin substrate 21a depending on the pattern, shape, or size set by users to form the hydrophobic area 24a (i.e. non-hydrophilic area) and define the hydrophilic area 23a simultaneously. In other words, the hydrophilic area 23a of the embodiment is defined by the coated hydrophobic material on the thin substrate 21a.

In detail, the thin substrate 21a of the embodiment may be a fiber substrate of hydrophilic material. Next, the hydrophobic material (wax) is sprayed or coated on the surface of the thin substrate 21a according to the pattern of the hydrophobic area 24a. Meanwhile, the area not coated with hydrophobic material acts as the hydrophilic area 23a. Therefore, the pattern of the hydrophobic area 24a of the embodiment has a plurality of parallel circular notch which acts as the hydrophilic area 23a. In the embodiment, because the hydrophilic area 23a is actually an area which is surrounded, defined and formed by the hydrophobic area 24a, the hydrophilic area 23a retains the hydrophilic property of the fiber substrate which the thin substrate 21a itself has.

Figure 3C:
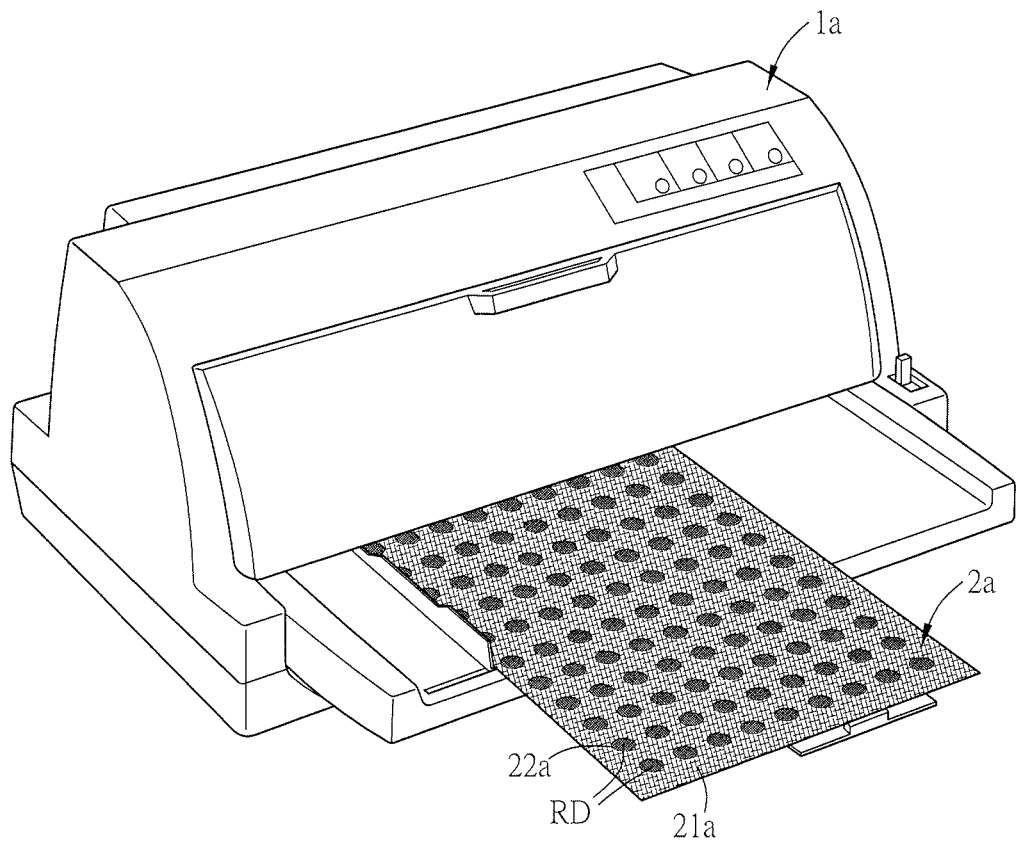
FIG. 3C is a schematic diagram of the dispensing unit and the detection device of the second embodiment of the present invention.

FIG. 3C is a schematic diagram of the dispensing unit 1a and the detection device 2a of the second embodiment of the present invention. Refer to FIGS. 3A to 3C. After the thin substrate 21a having the hydrophilic area 23a and the hydrophobic area 24a is prepared (step S01), a plurality of reagent droplets RD are dispensed to the thin substrate 21a by the dispensing unit 1a (step S10). The dispensing unit 1a of the embodiment is a printer having multiple piezoelectric nozzles for example. Practically, an ink cartridge may be used to accommodate the reagent, and the reagent is dispensed to the thin substrate 21a in droplets form (reagent droplets RD) by the piezoelectric nozzles of the dispensing unit 1a. In the embodiment, the amount of the reagent droplets RD discharged by the piezoelectric nozzles is effectively adjusted by controlling the voltage so that it may accurately dispense the reagent droplets RD to the thin substrate 21a to achieve efficiency of easy calibration. Further, because the thin substrate 21a is used in the embodiment and the thin substrate 21a has the hydrophilic area 23a and the hydrophobic area 24a (as shown in FIG. 3B), the reagent droplets RD may be effectively limited within the hydrophilic area 23a defined by the hydrophobic material. Specifically, when the reagent droplets RD are dispensed to the thin substrate 21a, on the surface of the thin substrate 21a, the reagent droplets RD can be concentrated to the hydrophilic area 23a and the reagent droplets RD can be absorbed within the hydrophilic area 23a. Alternatively, when the reagent droplets RD are absorbed by the thin substrate 21a, it avoids diffusing the reagent droplets RD outside the hydrophilic area 23a in the thin substrate 21a and effectively limits the reagent droplets RD to the hydrophilic area 23a defined by the hydrophobic material. It prevents the reagent droplets RD from loss and thus saving the amount of the reagent. After the thin substrate 21a absorbs the reagent droplets RD, the detection area 22a of the detection device 2a is formed in the hydrophilic area 23a (step S20). In other words, the hydrophilic area 23a of the embodiment forms the detection area 22a after absorbing the reagent droplets RD. The size of the thin substrate 21a and the size, location or number of the hydrophilic area 23a may all be dependent on the detection items and the equipment itself.

In addition, because the characteristic of the dispensing unit 1a is that it has multiple piezoelectric nozzles and its corresponding ink cartridges, different ink cartridges may accommodate different reagents, i.e. reagents for detecting different targets. For example, they may respectively accommodate various chemical detection reagents for detecting differently specific chemical substances or various antigen solutions for detecting differently specific antibody (protein). Here, the chemical detection reagent may be, for example, the combination of sulfanilamide, citric acid and N-(1-naphthyl)ethylenediamine or the combination of sulfanilic acid, 1-naphthylamine and acetic acid, and it can be used for detecting the content of nitrite in the food as a food safety detection. Moreover, the antigen solution may be, for example, a solution of type XVII collagen antigen having NC16A structural domain, and it can be used for detecting anti-NC16A antibody as a detection device for Pemphigoid.

Therefore, the dispensing unit 1a of the embodiment has a structure of multiple piezoelectric nozzles, and further has the characteristic of optionally selecting or collocating with different reagents to prepare the detection device which is capable of detecting a variety of differently specific targets and thus increase the number of detection items. In the application of popularizing the detection device, the dispensing unit 1a can be installed at multiple sites which may be, for example, clinics, pharmacies or convenience stores, etc. Therefore, the detection device for various detection items can be provided on a single site, and users may directly obtain the required detection device according to their own requirement on the above site. For example, if a user needs to detect pemphigoid, he may directly go to clinics, pharmacies or convenience stores and the like, and then obtains the detection device for pemphigoid to perform a simple detection thus achieving the prevention in advance. Similarly, users may further obtain the detection devices of food safety for detecting different chemical substances and keep them in the home environment in order to use them for food detection at any time.

Figure 4A:
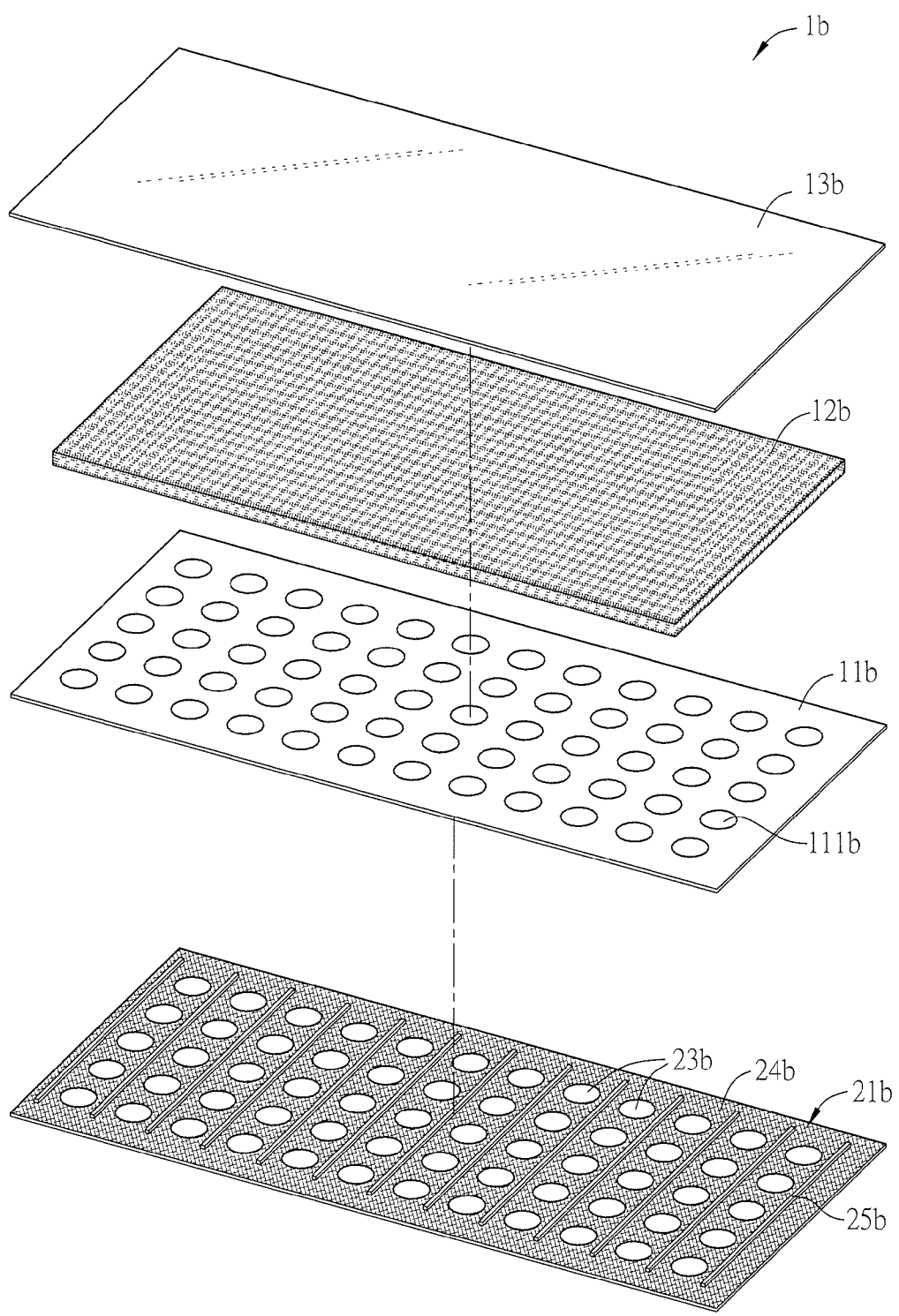
FIG. 4A is an exploded view of the dispensing unit of the third embodiment of the present invention.
Figure 4B:
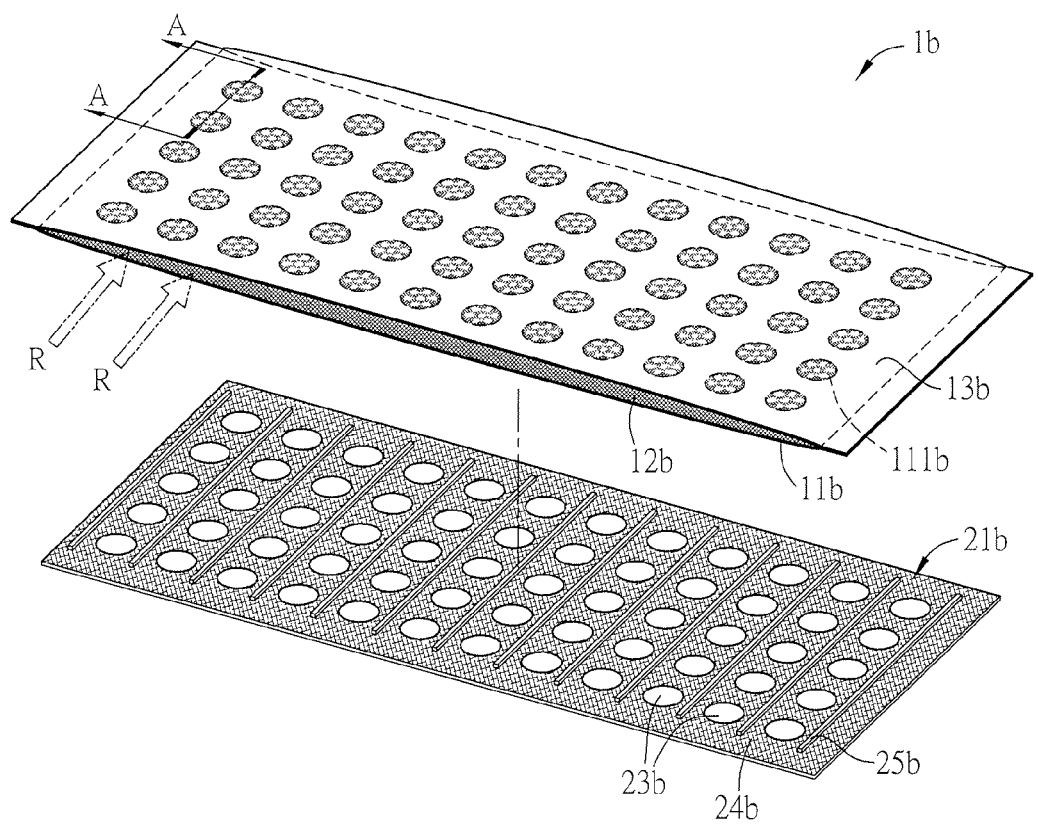
FIG. 4B is a schematic diagram of the dispensing unit shown in FIG. 4A.

In other embodiments, the reagent droplets RD may be dispensed to the thin substrate 21 by the dispensing unit 1 shown in FIG. 2 also or other types of dispensing units, and it is not limited in the present invention. FIG. 4A is an exploded view of the dispensing unit of the third embodiment of the present invention. FIG. 4B is a schematic diagram of the dispensing unit shown in FIG. 4A. Refer to FIGS. 4A and 4B simultaneously. The dispensing unit of the embodiment may be a stamping dispensing unit 1b including a droplet forming element 11b and a droplet accommodating unit 12b. The droplet forming element 11b has at least one opening 111b, and the droplet accommodating unit 12b is disposed on one side of the droplet forming element 11b. Therefore, when an external force is provided for the stamping dispensing unit 1b, the reagent accommodated in the droplet accommodating unit 12b may protrude from the opening 111b, i.e., forming the aspect that the reagent droplets RD protrude from the opening 111b (referring to FIG. 4C).

Preferably, the stamping dispensing unit 1b of the embodiment further includes a fixing element 13b, so that the droplet forming element 11b and the fixing element 13b may together form a space accommodating the droplet accommodating unit 12b. Specifically, the droplet forming element 11b and the fixing element 13b of the embodiment may be plastic sheets or hydrophobic membranes, and the plastic sheets are as examples to illustrate the embodiment.

Through bonding two opposite lateral sides of two plastic sheets (the droplet forming element 11b and the fixing element 13b), the unbonded portion between the droplet forming element 11b and the fixing element 13b may accommodate the droplet accommodating unit 12b to form the aspect that the droplet forming element 11b and the fixing element 13b clamp the droplet accommodating unit 12b and the droplet accommodating unit 12b is fixed by the fixing element 13b, as shown in FIG. 4B. The droplet accommodating unit 12b of the embodiment may be a water retention substrate. The water retention substrate of the embodiment refers to a substrate which can be pressed to overflow with liquid after absorbing liquid up to saturation. For example, it can be a substrate which can be squeezed to overflow with liquid such as, but not limited to, cotton, a sponge or other water retention substrates.

In the embodiment, the droplet accommodating unit 12b may be disposed between the droplet forming element 11b and the fixing element 13b after absorbing the reagent R up to saturation, or the droplet accommodating unit 12b may be filled with the reagent R through two unbonded lateral sides of the droplet forming element 11b and the fixing element 13b (the direction of injecting the reagent R is indicated as arrow symbols in FIG. 4B) to absorb the reagent R up to saturation after disposed between the droplet forming element 11b and the fixing element 13b. Moreover, the opening 111b of the droplet forming element 11b can receive the overflowed reagent R due to saturation or pressing force and form the aspect of droplets (reagent droplets RD) at the opening as shown in FIG. 4C.

Figure 4C:
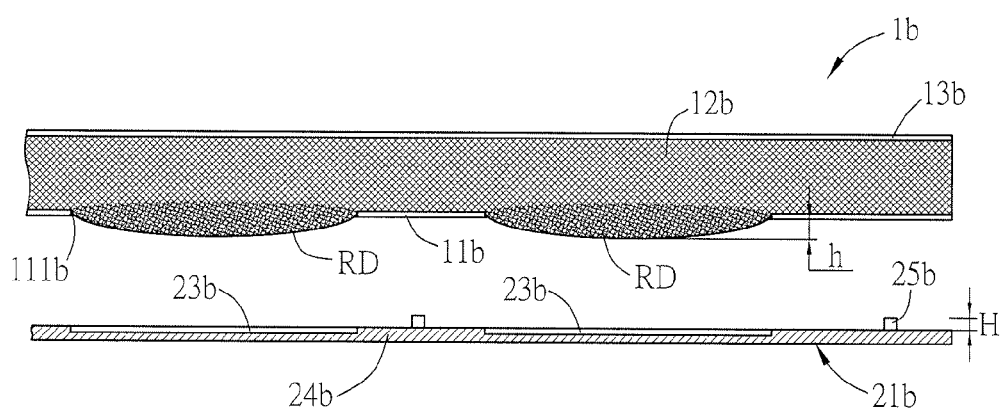
FIG. 4C is a sectional view along the line A-A of FIG. 4B.

FIG. 4C is a sectional view along the line A-A of FIG. 4B. Refer to FIGS. 4B and 4C. The stamping dispensing unit 1b of the embodiment may dispense the reagent droplets RD to the thin substrate 21b by the droplet forming element 11b. The hydrophilic area 23b of the thin substrate 21b may form the detection device 2b having a plurality of detection areas 22b after absorbing the reagent droplets RD (refer to FIG. 7). Specifically, the manufacturing method for a detection device of the embodiment further includes a step of providing an external force for the stamping dispensing unit 1b, so that the reagent droplets RD protrude from the opening 111b. In the embodiment, users may directly hold the stamping dispensing unit 1b and then provide an external force for the stamping dispensing unit 1b, i.e. gently pressing the stamping dispensing unit 1b, to form the reagent droplets RD at the opening 111b. Meanwhile, the droplet forming element 11b is made correspond to the hydrophilic area 23b of the thin substrate 21b, and thereby the reagent droplets RD are transferred to the thin substrate 21b. In addition, the reagent droplets RD may be transferred to the thin substrate 21b by the siphonage and the capillary action of the thin substrate 21b itself. Therefore, the relation of the vertical direction between the dispensing unit 1b and the thin substrate 21b is not limited, and the thin substrate 21b may be disposed above the dispensing unit 1b, too.

Furthermore, the thin substrate 21b of the embodiment has a spacing element 25b besides the hydrophilic area 23b and the hydrophobic area 24b. Therefore, when the stamping dispensing unit 1b approaches the thin substrate 21b, the reagent droplets RD protruding from the opening 111b are dispensed to the thin substrate 21b. In other words, it is not necessary for the dispensing unit 1b and the thin substrate 21b to completely contact each other for the purpose of dispensing the reagent droplets RD. Preferably, the spacing elements 25b may be disposed on two sides of the hydrophilic area 23b (as shown in FIG. 4B) or the spacing elements 25b may be disposed on two sides of the thin substrate 21b, and the height H of the spacing element 25b is smaller than the height h of the reagent droplets RD protruded from the opening 111b (as shown in FIG. 4C), so that the reagent droplets RD may be reliably transferred to the thin substrate 21b. In other words, the height H of the spacing element 25b is adjusted according to the height h of the protruded reagent droplets RD, and therefore the height H of the spacing element 25b is then determined after measuring the height h of the protruded reagent droplets RD. For example, if the opening 111b is a circular pore with a diameter of 6 mm and cotton is used as the droplet accommodating unit 12b, the height h of the reagent droplets RD protruded from the opening 111b is about 3.8 mm when droplet accommodating unit 12b absorbs the reagent R up to saturation, and thus the height H of the spacing element 25b may be designed as about 3.5 mm. The above is the specific description of one of the embodiments, and the present invention is not limited thereto.

A preferred embodiment is that first making the droplet forming element 11b correspond to the hydrophilic area 23b of the thin substrate 21b, and then the stamping dispensing unit 1b contacts the spacing element 25b by gently pressing the stamping dispensing unit 1b, so that the reagent droplets RD are transferred to the thin substrate 21b from the opening 111b, i.e., the reagent droplets RD are formed and transferred to the thin substrate 21b at the time of pressing.

Figure 5:
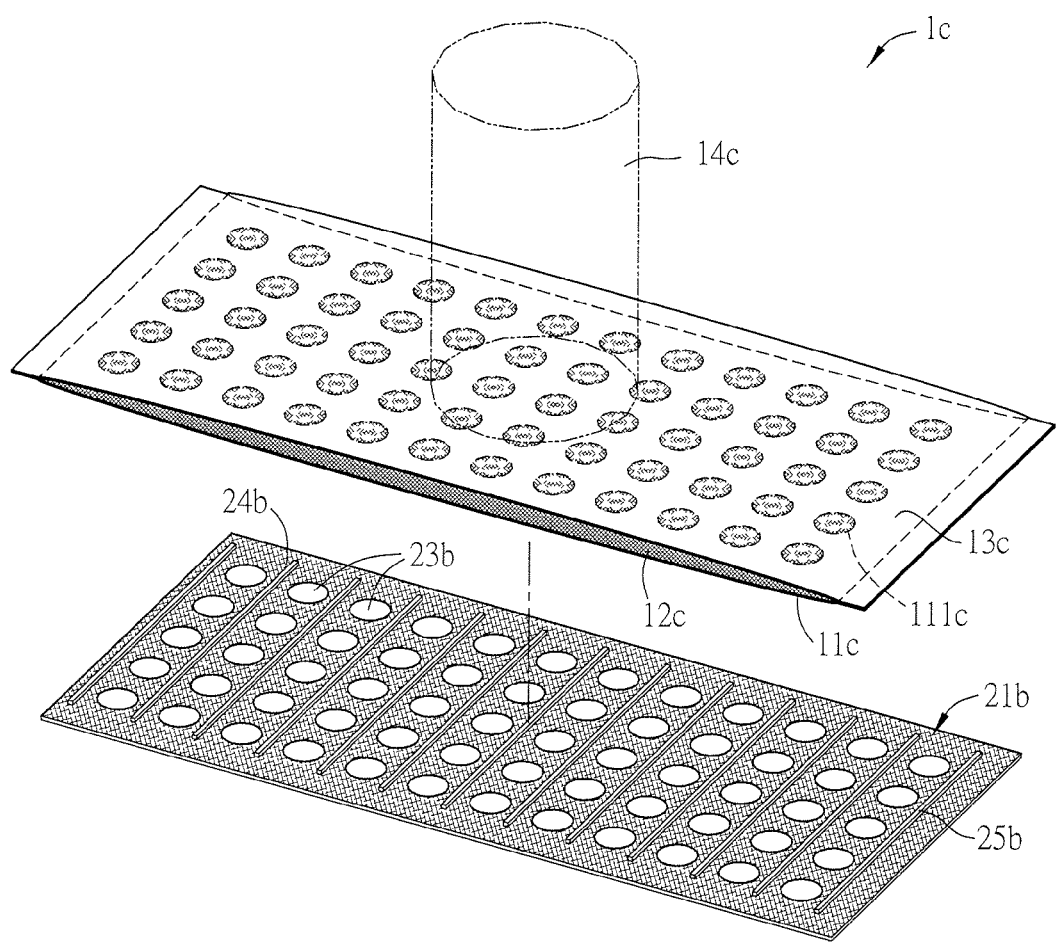
FIG. 5 is a schematic diagram of the dispensing unit of the fourth embodiment of the present invention.

Referring to FIG. 5, it is a schematic diagram of the dispensing unit of the fourth embodiment of the present invention, and it is also another embodiment of the stamping dispensing unit shown in FIG. 4A. In the embodiment, the stamping dispensing unit 1c of the embodiment further has a pressure providing unit 14c disposed on the opposite side of the droplet forming element 11c, i.e. disposed on the opposite side of the fixing element 13c to the droplet forming element 11c in the embodiment. Preferably, the fixing element 13c and the pressure providing unit 14c may be an integral structure. The pressure providing unit 14c of the embodiment refers to an element for which a force is provided. For example, a user may provide an external force for the stamping dispensing unit 1c by holding the pressure providing unit 14c of the embodiment, so that the reagent droplets RD are formed at the opening 111c and transferred to the thin substrate 21b. The part of the reagent droplets RD refers to FIG. 4C. Of course, in other embodiments, the pressure providing unit 14c is gripped by a mechanical arm through automation machine and equipment to provide an external force for the stamping dispensing unit 1c, and present invention is not limited thereto.

Figure 6A:
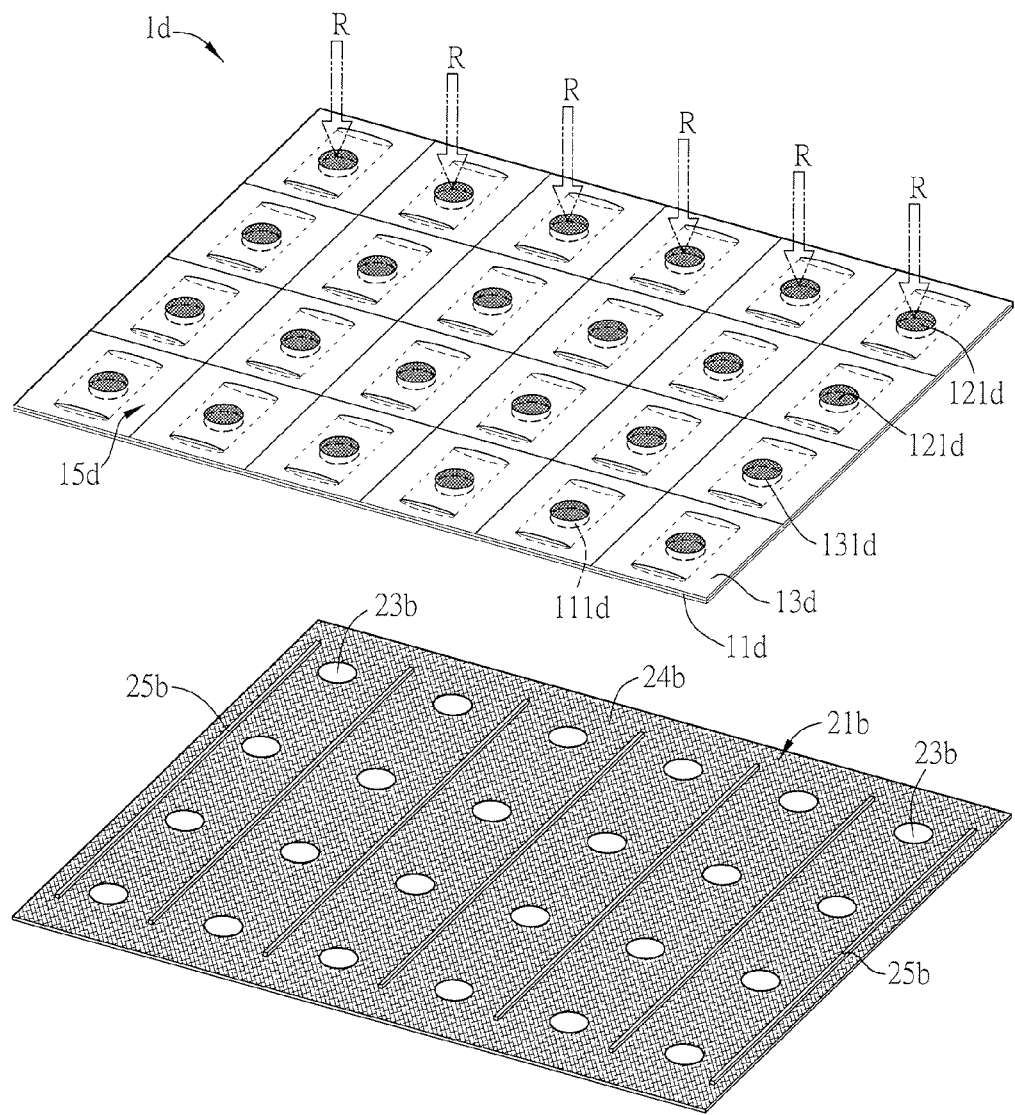
FIG. 6A is a schematic diagram of the dispensing unit of the fifth embodiment of the present invention.
Figure 6B:
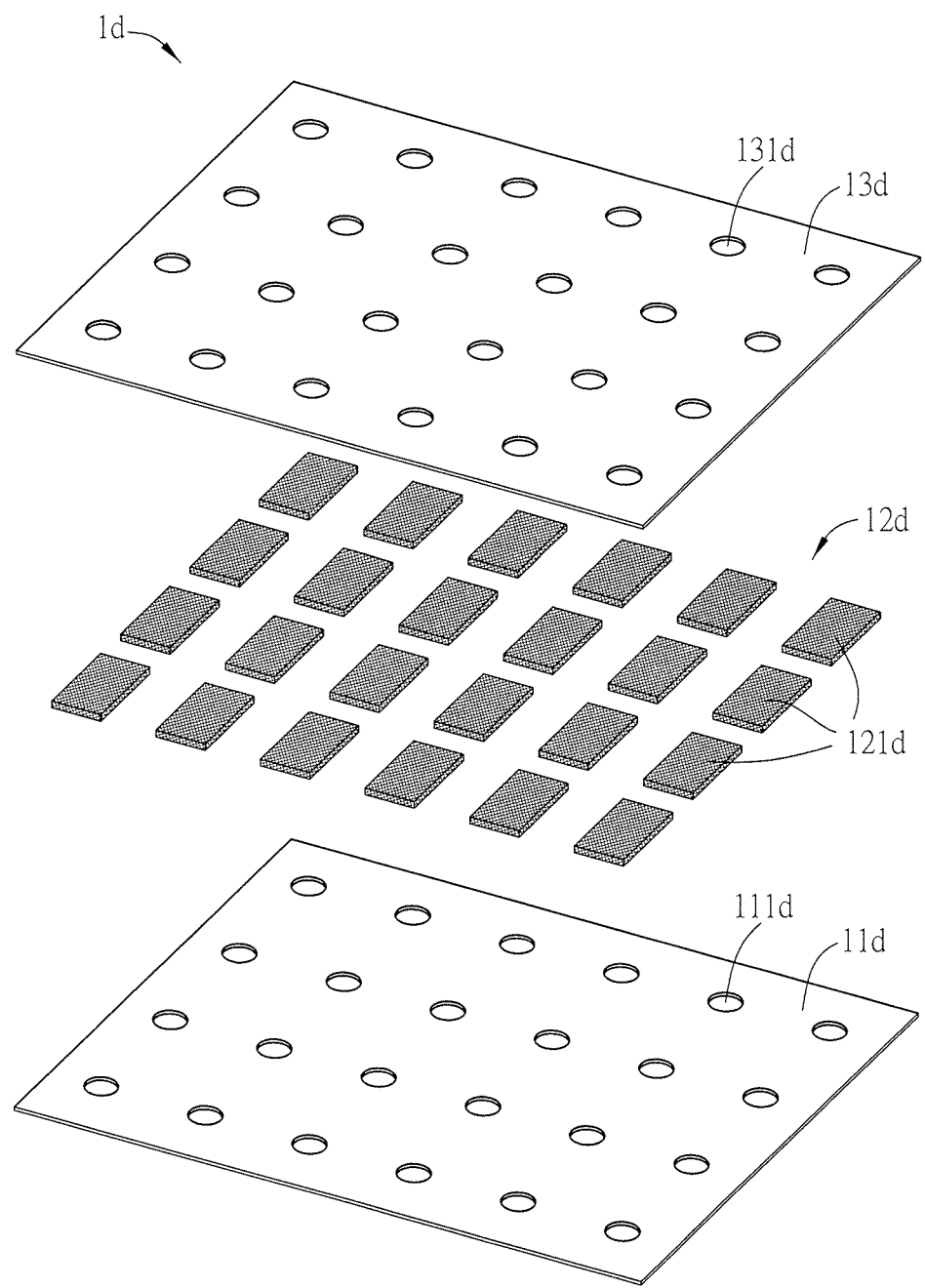
FIG. 6B is an exploded view of the dispensing unit shown in FIG. 6A.

FIG. 6A is a schematic diagram of the dispensing unit of the fifth embodiment of the present invention, FIG. 6B is an exploded view of the dispensing unit shown in FIG. 6A, and the dispensing unit of the fifth embodiment is another embodiment of the stamping dispensing unit shown in FIG. 4A. Referring to FIGS. 6A and 6B, the droplet forming element 11d and the fixing element 13d of the stamping dispensing unit 1d of the embodiment may be the above mentioned hydrophobic materials (plastic sheets) which are oppositely disposed and bonded on four sides, and the droplet accommodating unit 12d is similarly accommodated between the droplet forming element 11d and the fixing element 13d. Similarly, the droplet forming element 11d of the embodiment has a plurality of openings 111d. In the embodiment, the sealed portion 15d is disposed between each opening 111d, and the sealed portion 15d is formed by bonding the fixing element 13d and the droplet forming element 11d mutually. Upon forming the sealed portion 15d, the droplet accommodating unit 12d is simultaneously divided into a plurality of dependent droplet accommodating subunits 121d, and each droplet accommodating subunit 121d corresponds to one of the openings 111d.

In the embodiment, the droplet accommodating subunit 121d is sealed between the droplet forming element 11d and the fixing element 13d, and the fixing element 13d similarly has a plurality of openings 131d to correspond to the droplet accommodating subunits 121d and the openings 111d. Thus, the droplet accommodating subunit 121d may be filled with the reagent R through the opening 131d (the direction of injecting the reagent R is indicated as arrow symbols in FIG. 6A) to absorb the reagent R up to saturation. The actuating manner of transferring the reagent droplets RD to the thin substrate 21b may refer to the above mentioned stamping dispensing unit 1b, and they are not repeated here. The droplet accommodating unit 12d of the stamping dispensing unit 1d of the embodiment may be divided to form a plurality of droplet accommodating subunits 121d which are concentrated and disposed on one side of the openings 111d, and therefore the amount of the reagent R may be saved. On the other hand, because each droplet accommodating subunit 121d is an independent structure, various reagents for detecting different detection targets may be injected through the different openings 131d, and thus the detection device 2b for detecting different detection targets may be prepared at once (refer to FIG. 7 first).

Figure 7:
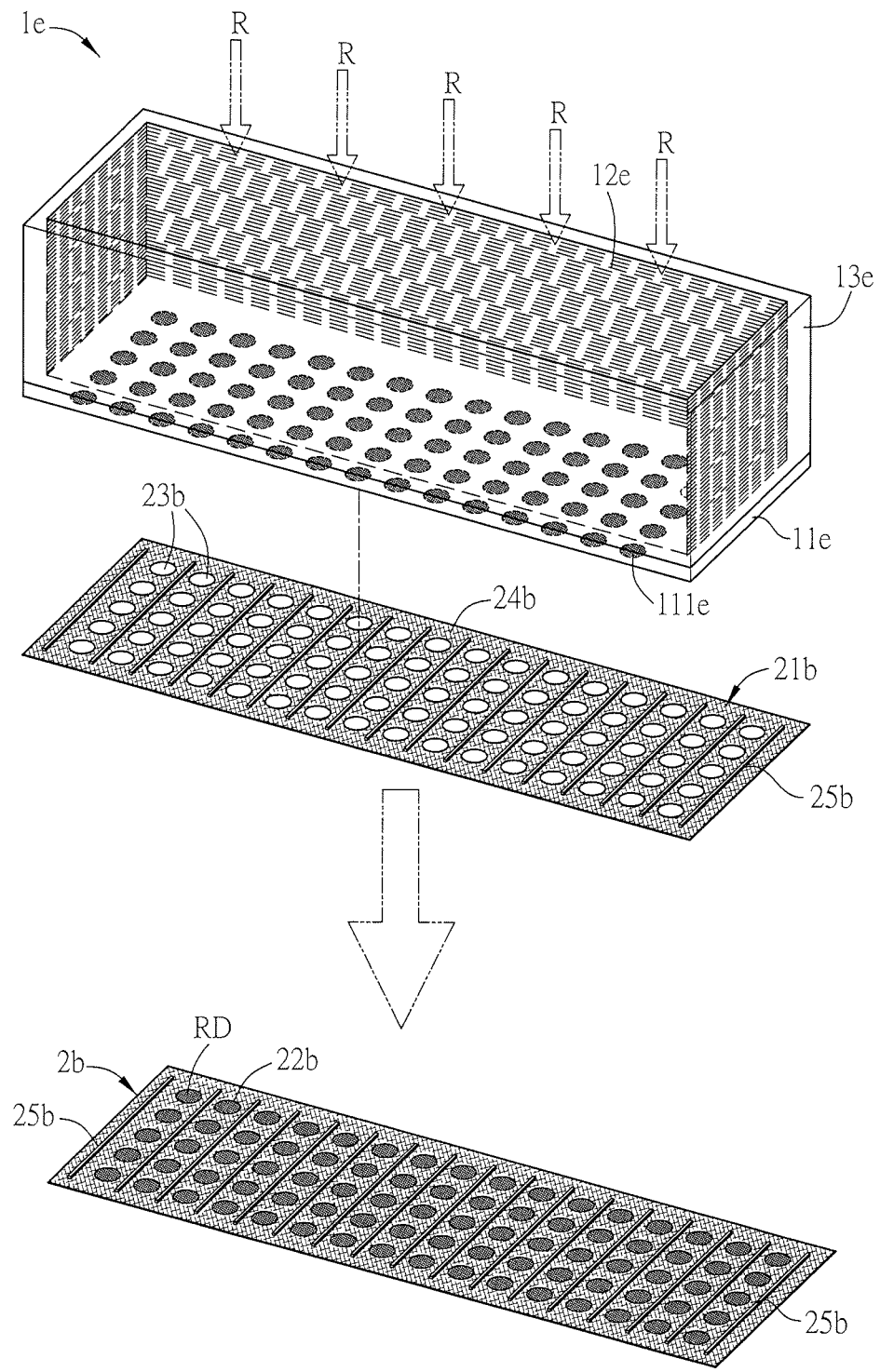
FIG. 7 is a schematic diagram of the dispensing unit and the detection device manufactured by the dispensing unit of the sixth embodiment of the present invention.

Referring to FIG. 7, it is a schematic diagram of the dispensing unit and the detection device manufactured by the dispensing unit of the sixth embodiment of the present invention, and the dispensing unit of the sixth embodiment is similarly another embodiment of the stamping dispensing unit shown in FIG. 4A. The droplet forming element 11e of the stamping dispensing unit 1e of the embodiment may be a hydrophobic material (plastic sheet) as described above and have a structure of at least one opening 111e, and the fixing element 13e may be a three-dimensional structure. As shown in FIG. 7, the fixing element 13e has four side walls surrounding the periphery of the droplet forming element 11e and thus form a space to fix the droplet accommodating unit 12e within the space. The actuating manner of transferring the reagent droplets RD to the thin substrate 21b may refer to above mentioned stamping dispensing unit 1b, and they are not repeated here.

Figure 8:
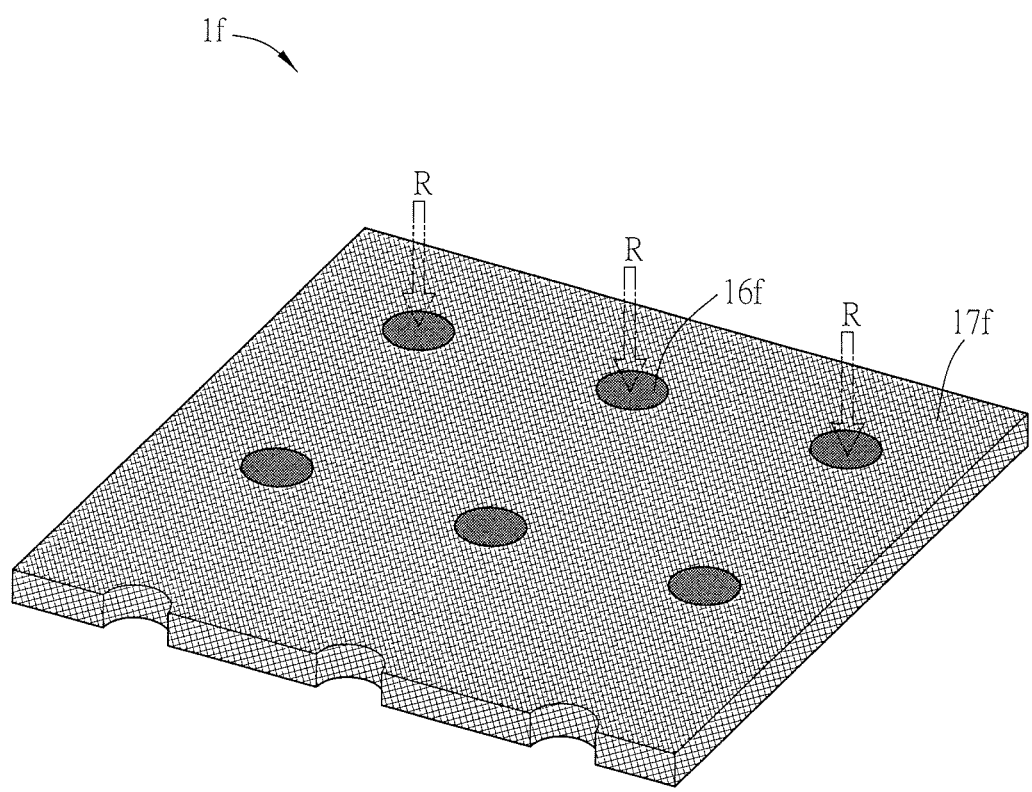
FIG. 8 is a lateral view of the dispensing unit of the seventh embodiment of the present invention.

Referring to FIG. 8, it is a lateral view of the dispensing unit of the seventh embodiment of the present invention. The dispensing unit of the seventh embodiment is similarly a stamping dispensing unit if having a plurality of droplet forming portions 16f and hydrophobic portions 17f. Specifically, the stamping dispensing unit 1f is similarly composed of cotton fibers and defined by the hydrophobic substances, thereby forming a plurality of hydrophilic droplet forming portions 16f and hydrophobic portions 17f. Wherein, the droplet forming portions 16f are hydrophilic materials of the cotton fibers themselves, and the hydrophobic portions 17f are formed by penetration of the hydrophobic substances into the cotton fibers. Therefore, the reagent R may be absorbed by the hydrophilic droplet forming portions 16f up to saturation and formed the reagent droplets RD on one side. The actuating manner of transferring the reagent droplets RD to the thin substrate 21b may refer to above mentioned stamping dispensing unit 1b, and they are not repeated herein.

In addition, the dispensing unit 1g may be a hydrophobic substrate bearing the reagent R distributed in the form of reagent droplets RD. Then, the reagent droplets RD distributed on the dispensing unit 1g are transferred to the thin substrate 21, the thin substrate 21a or the thin substrate 21b.

Figure 9:
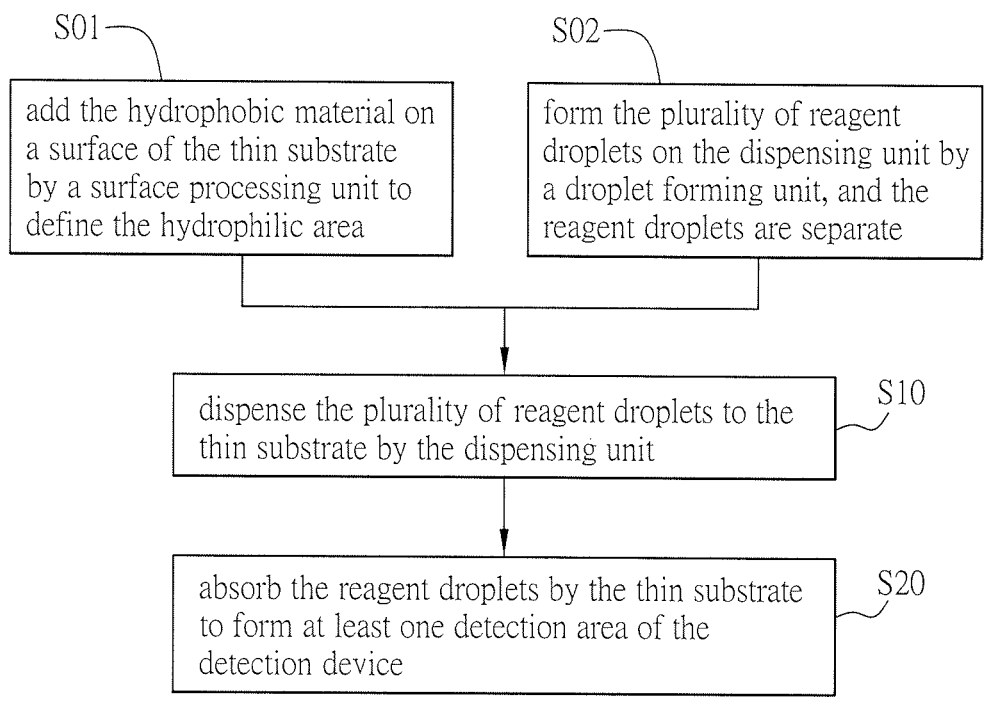
FIG. 9 is a flow chart of the manufacturing method for the detection device of the eighth embodiment of the present invention.

The method of manufacturing the dispensing unit 1g of the embodiment is described below. FIG. 9 is a flow chart of the manufacturing method for the detection device of the eighth embodiment of the present invention. As shown in FIG. 9, the manufacturing method for the detection device of the embodiment further includes a step of forming a plurality of reagent droplets on the dispensing unit by a droplet forming unit, and the reagent droplets are separate (step S02), and it is a step of manufacturing the dispensing unit 1g.

Figure 10A:
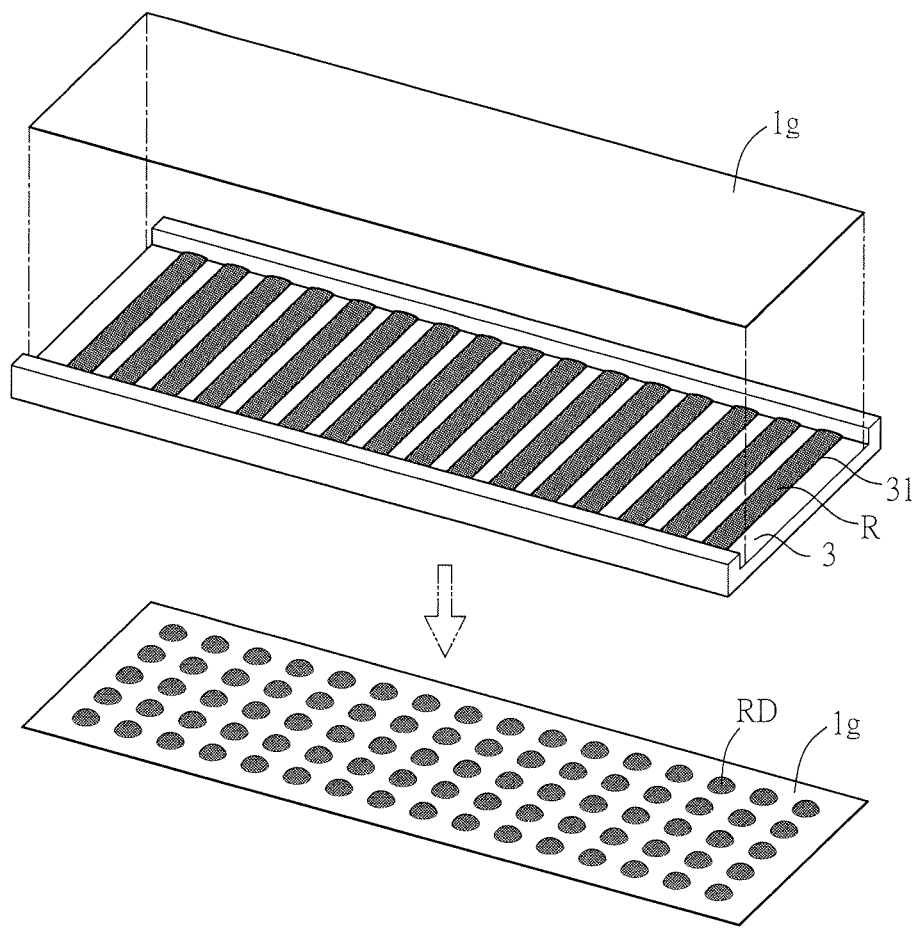
FIG. 10A is a schematic diagram of manufacturing the dispensing unit of an embodiment of the present invention.
Figure 10B:
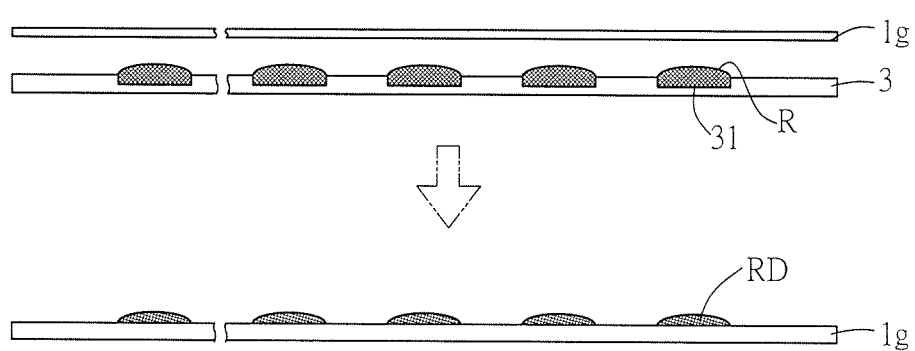
FIG. 10B is a sectional view of manufacturing the dispensing unit shown in FIG. 10A.

Referring to FIGS. 10A and 10B, FIG. 10A is a schematic diagram of manufacturing the dispensing unit 1g of an embodiment of the present invention, and FIG. 10B is a sectional view of manufacturing the dispensing unit 1g shown in FIG. 10A. In the embodiment, a plurality of reagent droplets RD are first formed on the dispensing unit 1g by a droplet forming unit 3, and the droplet forming unit 3 of the embodiment refers to a device which may bear the reagent R and form the reagent droplets RD on the dispensing unit 1g. Specifically, the droplet forming unit 3 and the dispensing unit 1g of the embodiment are hydrophobic substrates. The droplet forming unit 3 may be Teflon, a plastic sheet or other hydrophobic substrates. The substrate for the dispensing unit may be a paper substrate, a cotton substrate, or a xylem fiber substrate, and its outer layer is coated with wax to form a substrate having a hydrophobic surface. The aspect ratio of the droplet forming unit 3 may be 3:2, and the surface of the droplet forming unit 3 has a plurality of concave portions 31. Moreover, the concave portion 31 of the embodiment may be a long strip shaped flow channel, and the aspect ratio of the flow channel is preferably between 1:10 to 1:3. Therefore, the reagent R may be accommodated in the concave portion 31, and at least a part of the surface of the reagent R protrudes from the surface of the droplet forming unit 3 due to the surface tension.

In step S02, the surface of the droplet forming unit 3 approaches or contacts the surface of the dispensing unit 1g to destroy the surface tension of the surface of the reagent R. The reagent R is partially transferred to the dispensing unit 1g resulting from the siphonage and the capillary action of the dispensing unit 1g. At this time, a plurality of reagent droplets RD may be formed on the surface of the dispensing unit 1g. The reagent droplets RD are arranged to separate from each other on the dispensing unit 1g because of the dispensing unit 1g of the hydrophobic substrate and the cohesion of the reagent droplets RD themselves.

Preferably, the hydrophobicity of the droplet forming unit 3 is higher than that of the dispensing unit 1g. Therefore, when the surface of the droplet forming unit 3 approaches or contacts the surface of the dispensing unit 1g, besides the siphonage and the capillary action of the dispensing unit 1g, it may further utilize the characteristic that the hydrophobicity of the droplet forming unit 3 is higher than that of the dispensing unit 1g, i.e. the characteristic that the hydrophilicity of the dispensing unit 1g is higher than that of the droplet forming unit 3, to partially transfer the reagent R to the dispensing unit 1g effectively. Moreover, the dispensing unit 1g itself is a hydrophobic substrate, and it may further result in that the reagent R form a plurality of reagent droplets RD on the surface of the dispensing unit 1g.

Figure 10C:
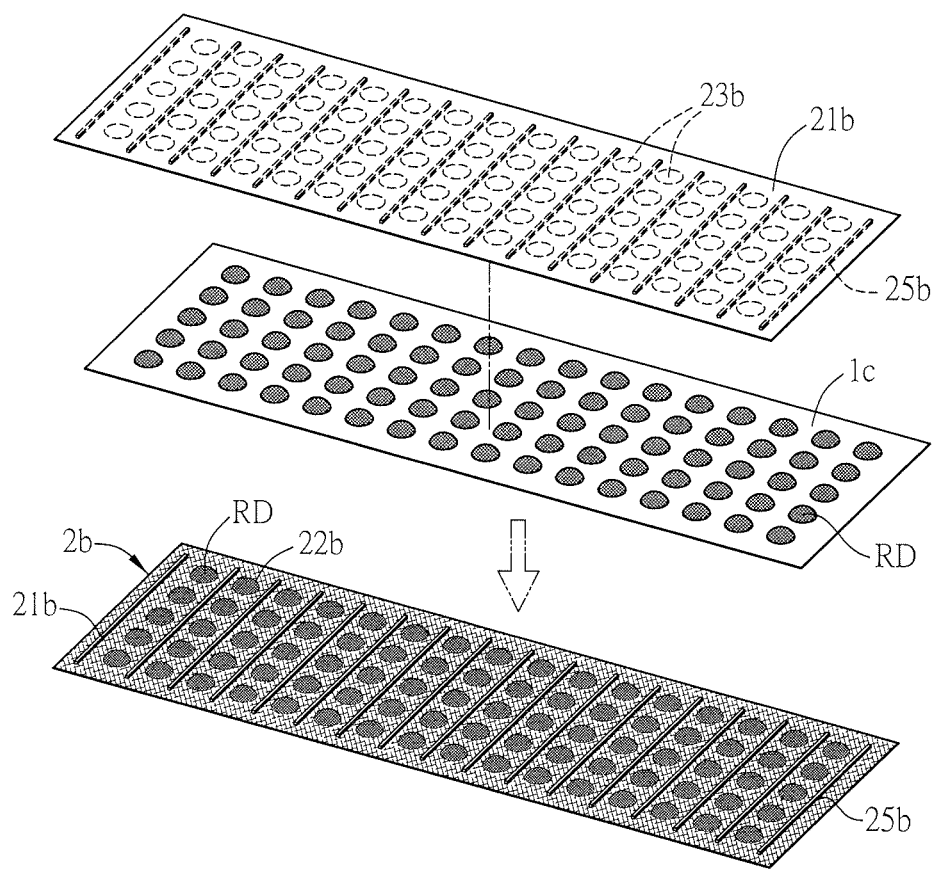
FIG. 10C is a schematic diagram of the dispensing unit shown in FIG. 10A manufacturing the detection device.
Figure 10D:
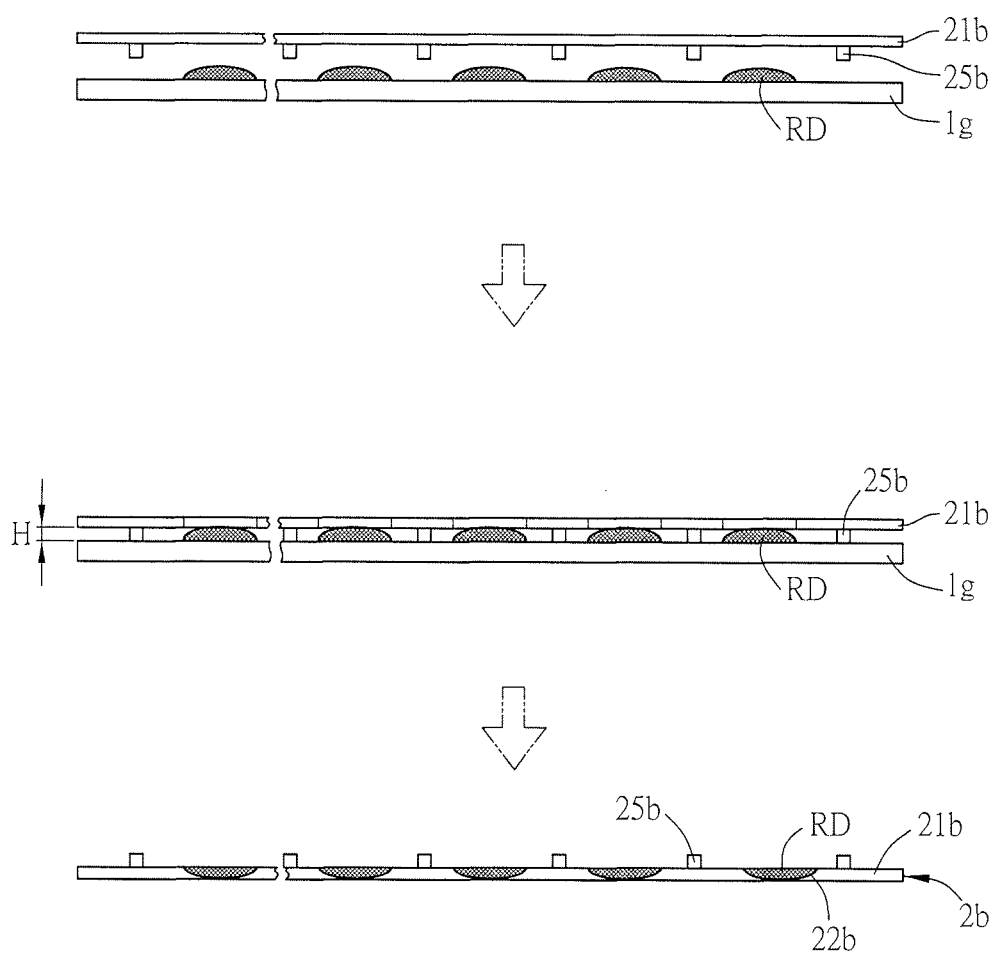
FIG. 10D is a sectional view of an embodiment of manufacturing the detection device shown in FIG. 10C.

Referring to FIGS. 9, 10C and 10D, FIG. 10C is a schematic diagram of the dispensing unit 1g shown in FIG. 10A manufacturing the detection device 2b, and FIG. 10D is a sectional view of an embodiment of manufacturing the detection device 2b shown in FIG. 10C. Similarly, the dispensing unit 1g is disposed on one side of the thin substrate 21b which is manufactured by step S01. In other embodiments, the thin substrate 21 or the thin substrate 21a may also be used. It should be noted that the thin substrate 21b is disposed above the dispensing unit 1g as shown in FIGS. 10C and 10D, of course, the thin substrate 21b may also be disposed below the dispensing unit 1c, and the present invention is not limited thereto. In step S10, as shown in FIG. 10D, the top of the spacing element 25b of the thin substrate 21b abuts upon the dispensing unit 1g, so that the thin substrate 21b approaches the dispensing unit 1g up to the distance between them which is equal to the height H of the spacing element 25b. Then, it further results in that the reagent droplets RD contacts the thin substrate 21b, so that the thin substrate 21b utilize its siphonage and capillary action to transfer the reagent droplets RD to the thin substrate 21b, and it may absorb the reagent droplets RD gently in order to maintain the shape of the thin substrate 21b after absorbing the reagent droplets RD.

Figure 11:
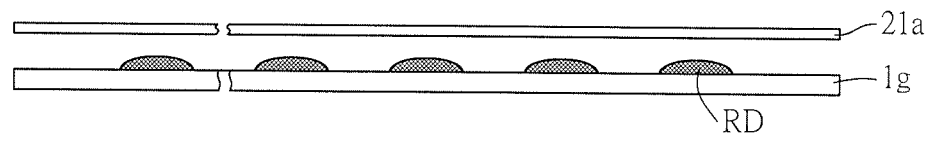
FIG. 11 is a sectional view of another embodiment of manufacturing the detection device shown in FIG. 10C.
Figure 11:
Figure 11:
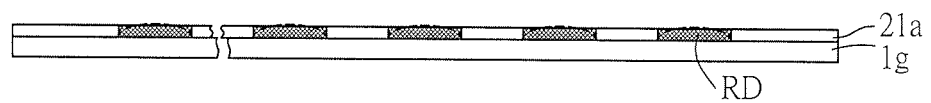
Figure 11:
Figure 11:
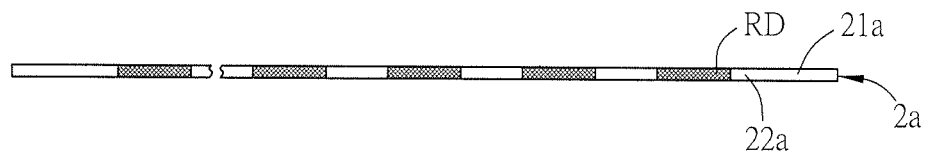

In addition, the thin substrate 21a may also directly contacts the dispensing unit 1g as shown in FIG. 11. FIG. 11 is a sectional view of another embodiment of manufacturing the detection device shown in FIG. 10C. In the embodiment, the thin substrate 21a may absorb the reagent droplets RD rapidly, and utilize the structural design of the hydrophilic area 23a and hydrophobic area 24a of the thin substrate 21a (referring to FIG. 3B) to retain the reagent droplets RD within the hydrophilic area 23a.

After the thin substrate 21a absorbs the reagent droplets RD, the detection area 22a of the detection device 2a is formed (step S20), so it may apply to various biomedical detection or food detection depending on the type of the reagent R. The details of step S10 and S20 of manufacturing the detection device 2a may refer to the above embodiments, and they are not repeated here. Additionally, in other embodiments, various reagents used for detecting different detection targets may be further accommodated in a plurality of concave portions of the droplet forming unit to prepare a detection device for detecting various different specific targets. It is thus more consistent with the purpose of manufacturing abundantly and saving time.

Next, the actual operation and the effect of the detection device 2a of the present invention will be specifically described with experimental examples. It should be noted that the following description is used to describe the present invention in detail and make it be carried out accordingly by a person skilled in the art, it may be also performed by applying the detection devices of other embodiments of the present invention, and the present invention is not limited thereto.

Experimental example: performing the nitrite test by detection device 2a

This experimental example is described by the stamping dispensing unit 1b of the third embodiment for example. The droplet accommodating unit 12b of the stamping dispensing unit 1b absorbs a chemical detection reagent (i.e. the reagent R of above embodiments), wherein the chemical detection reagent includes 50 mmol/L sulfanilamide (≥99%, Sigma-Aldrich), 330 mmol/L citric acid (≥99.5%, Sigma-Aldrich), and 10 mmol/L N-(1-naphthyl)ethylenediamine (≥98%, Sigma-Aldrich). Next, the chemical detection reagent is transferred to the thin substrate 21a by the stamping dispensing unit 1b, and then it is dried for 15 minutes at 25° C. to form the detection device 2a. Then, a test sample is dropped on the detection area 22a of the detection device 2a, wherein the source of the test sample includes the nitrite standard which is prepared by deionized water (buffer group) and the soup of hot pot which adds the nitrite standard (spiking test) (food group). In 7 minutes, determining the coloring intensity of the detection area 22a is performed by ImageJ image analyzing program.

Figure 12A:
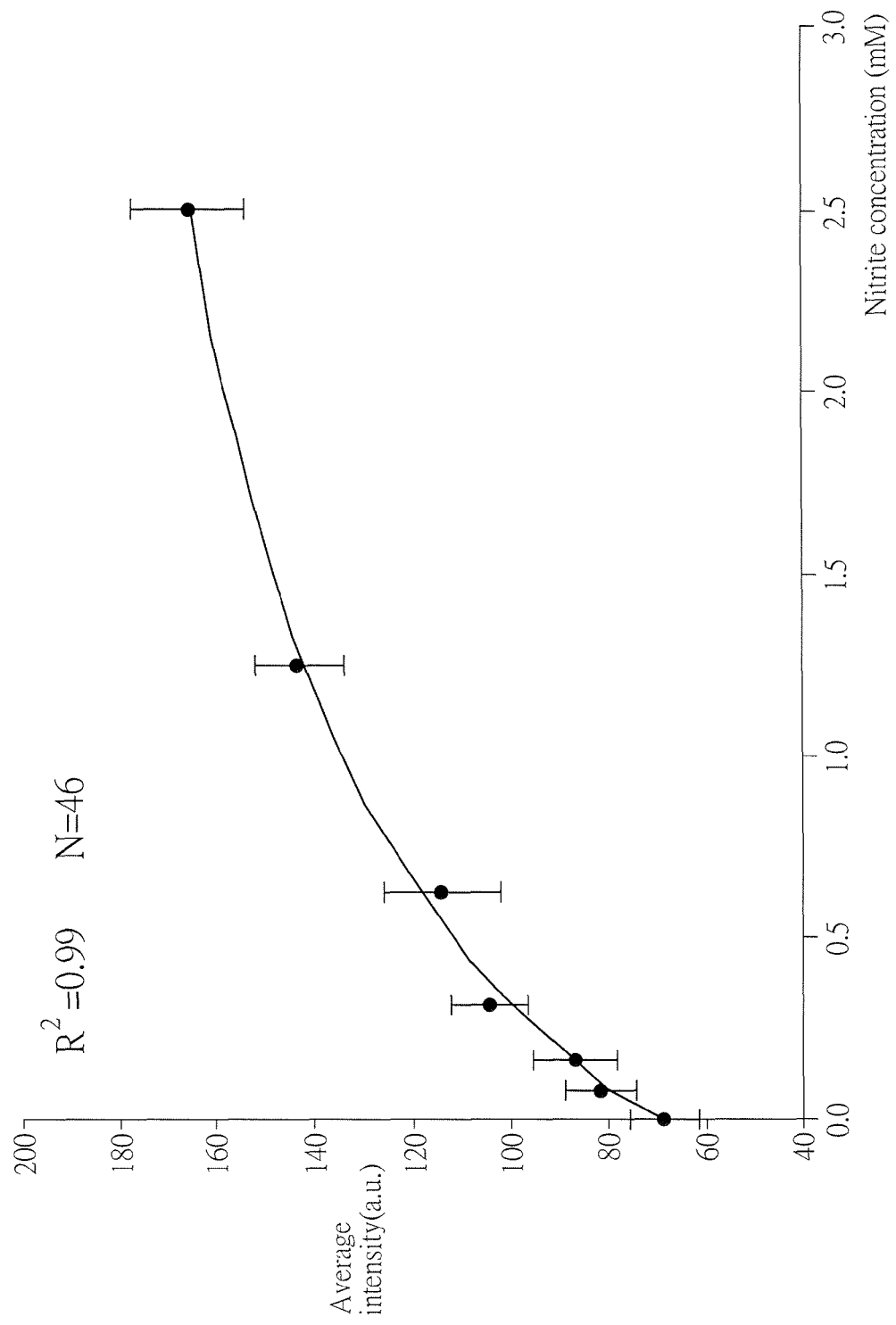
FIGS. 12A and 12B are schematic diagrams showing the results of detecting nitrite by the detection device shown in FIG. 4B.
Figure 12B:
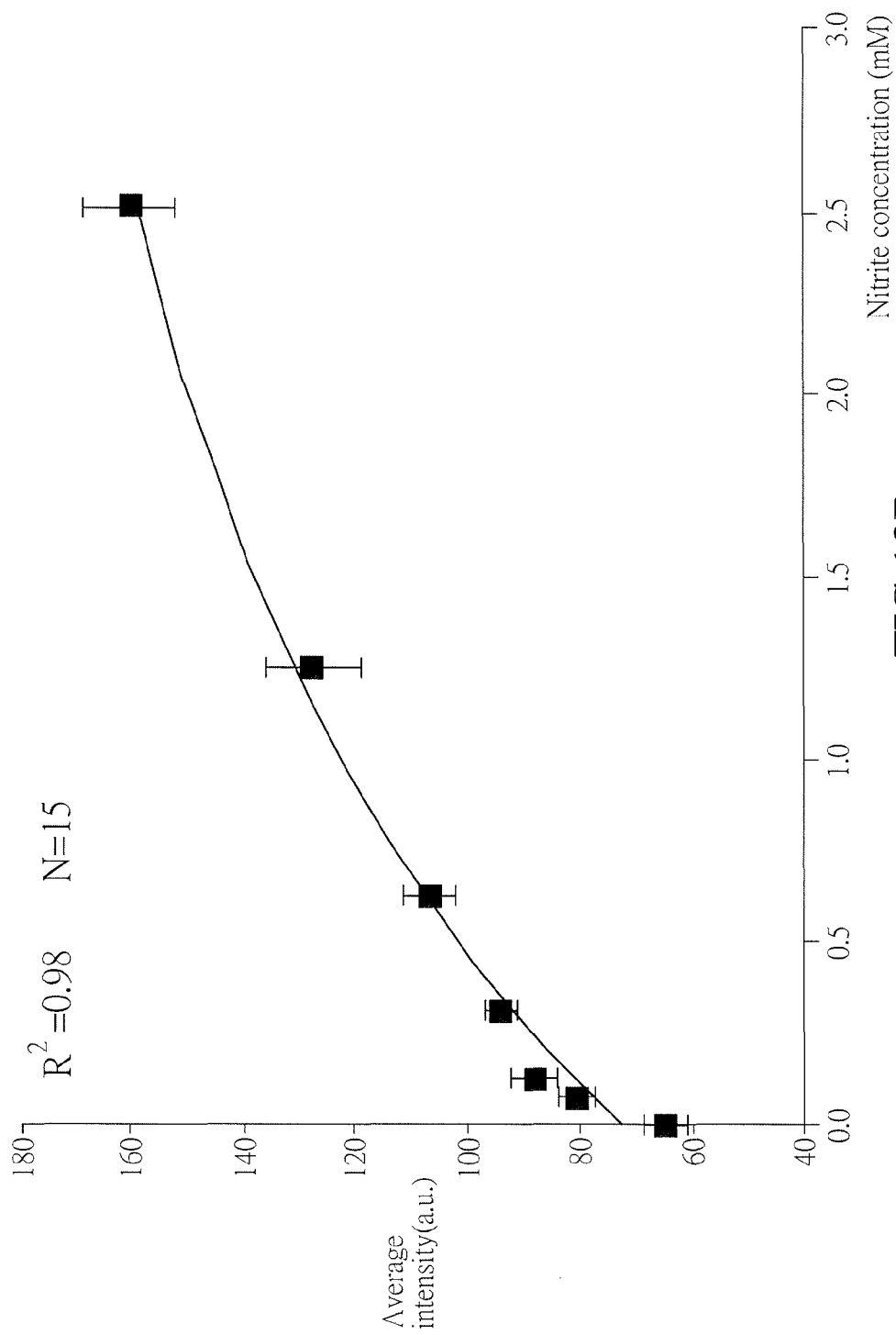

FIGS. 12A and 12B are schematic diagrams showing the results of detecting nitrite by the detection device shown in FIG. 4B. Referring to FIGS. 12A and 12B, after the test sample reacts with the chemical detection reagent, detecting the average intensity of the coloring shows that the average intensity of the coloring increases with the increase of the concentration of nitrite.

In summary, the manufacturing method for the detection device according to the present invention utilizes the characteristic of the thin substrate which absorbs the droplets and dispenses the reagent droplets to the thin substrate by a dispensing unit. After absorbing the reagent droplets to form the detection device having detection areas, the thin substrate may be used as a biomedical detection device or a food safety detection device. In other words, the manufacturing method of the present invention has developed simple and low-cost process for the thin substrate, and thus it is contributive to promote the detection device of such thin substrate. Moreover, because the detection device of the present invention is prepared by the thin substrate, it is beneficial for the user to carry or keep in the home environment in order to achieve the efficiency of home self-detection.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A manufacturing method for a detection device, comprising:
    dispensing a plurality of reagent droplets of a detection reagent to a porous fiber substrate by a dispensing unit, wherein the dispensing unit comprises two plastic sheets and a water retention substrate, wherein the water retention substrate is clamped between the two plastic sheets; the water retention substrate contains the detection reagent, and one of the two plastic sheets has at least one opening; and
    absorbing the plurality of reagent droplets by the porous fiber substrate to form the detection device having at least one detection area.

2. The manufacturing method of claim 1, wherein the porous fiber substrate has a pattern of hydrophilic areas, and the porous fiber substrate absorbs the plurality of reagent droplets to form the at least one detection area in the pattern of hydrophilic areas.

3. The manufacturing method of claim 2, wherein the pattern of hydrophilic areas is defined by a hydrophobic material disposed on the porous fiber substrate.

4. The manufacturing method of claim 3, further comprising:
    spraying the hydrophobic material on the porous fiber substrate so as to define the pattern of hydrophilic areas.

5. The manufacturing method of claim 1, further comprising:
    pressing the two plastic sheets of the dispensing unit, so that the plurality of reagent droplets protrude from the at least one opening.

* * * * *